US 9,228,495 B2

(12) United States Patent
Scanlon

(10) Patent No.: US 9,228,495 B2
(45) Date of Patent: Jan. 5, 2016

(54) VORTEX REDUCER

(75) Inventor: Timothy J. Scanlon, Derby (GB)

(73) Assignee: ROLLS-ROYCE plc, London (GB)

(*) Notice: Subject to any disclaimer, the term of this patent is extended or adjusted under 35 U.S.C. 154(b) by 801 days.

(21) Appl. No.: 13/467,423

(22) Filed: May 9, 2012

(65) Prior Publication Data
US 2012/0301272 A1 Nov. 29, 2012

(30) Foreign Application Priority Data

May 26, 2011 (GB) .................................. 1108842.4

(51) Int. Cl.
F02C 6/08 (2006.01)
F04D 29/32 (2006.01)

(52) U.S. Cl.
CPC ............... F02C 6/08 (2013.01); F04D 29/321 (2013.01)

(58) Field of Classification Search
CPC .................... F02C 7/185; F02C 7/16
USPC .......................................................... 60/782
See application file for complete search history.

(56) References Cited

U.S. PATENT DOCUMENTS 6,361,277 B1    3/2002  Bulman et al.
6,428,272 B1 *  8/2002  Pepi et al. ................... 416/96 R
6,857,851 B2 *  2/2005  Avignon et al. ............... 415/116
7,828,514 B2 * 11/2010  Kutz ............................. 415/115
2003/0101730 A1  6/2003  Hein et al.
2004/0179936 A1  9/2004  Fitzgerald et al.
2009/0282834 A1 11/2009  Hein
2010/0266387 A1* 10/2010  Bintz et al. ................... 415/115

FOREIGN PATENT DOCUMENTS

EP    2 243 928 A2   10/2010
GB    2 207 465 A     2/1989

OTHER PUBLICATIONS

Sep. 16, 2011 Search Report issued in British Patent Application No. 1108842.4.

* cited by examiner

Primary Examiner — Nathaniel Wiehe
Assistant Examiner — Michael Sehn
(74) Attorney, Agent, or Firm — Oliff PLC

(57) ABSTRACT

The present disclosure relates to a vortex reducer (100) for a bleed flow (104) in an axial turbomachine comprising a rotor disc (113). The vortex reducer may comprise one or more guide channels (122) arrangeable adjacent to a first side (113a) of the rotor disc to at least partially de-swirl the bleed flow. The vortex reducer may further comprise a passage (130) connecting the first side of the rotor disc to a high pressure flow source capable of providing flow (134) to the first side of the rotor disc to mix with the bleed flow on the first side of the rotor disc.

11 Claims, 4 Drawing Sheets

VORTEX REDUCER

The present disclosure relates to a vortex reducer for the guidance of bleed airflows and particularly but not exclusively relates to a vortex reducer for minimizing pressure losses through bleed off-takes in axial compressors. Furthermore, the present disclosure relates a method for the guidance of bleed airflows by the vortex reducer.

In a gas turbine, bleed airflows are branched off from a mainstream flow in the compressor to carry out the cooling of, or sealing between, certain components. The bleed airflows may be branched off between two adjacent rotor discs of the compressor, e.g. in the sixth stage of a high-pressure compressor. By way of example, a portion of the mainstream flow may be bled into holes or passages provided in the compressor hub and passed through an inter-disc chamber between the two rotor discs in the direction of the shaft. In the inter-disc chamber, the bleed airflows form a free bleed air vortex which produces high pressure losses.

Once the bleed airflows have passed through the inter-disc chamber, they are guided downstream along the shaft into the area of the turbine to seal there, for example, the interspaces between the rotor discs of the turbine. Subsequently, the bleed air is discharged into the gas flow.

In a typical inboard bleed between compressor discs, conservation of angular momentum of the inwardly flowing and swirling air causes it to form a very strong vortex. The acceleration to very high tangential velocities at the disc bores results in a large pressure loss. An example of this kind of system is the IP5 system on the Trent 1000 engine, as shown in FIG. 1(a). As depicted, the bleed flow 1 flows through an opening 5 and radially inwardly between adjacent rotor discs 3, 4. The tangential velocity of the bleed flow increases as its distance from the centreline of the engine reduces.

In order to minimize the pressure loss, vortex reducers may be used. A vortex reducer is advantageous in that the air is not increased in circumferential speed as it passes through the inter-disc chamber towards the shaft centre and, therefore, does not form a free vortex. Consequently, the pressure loss resulting therefrom is less than it would be with a non-vortex reduced system. Two types of vortex reducer are typically employed: tube-type vortex reducers and tubeless vortex reducers.

In their simplest form, tube-type vortex reducers are straight, radially inwardly directed tubular systems in which the air is positively guided. See for example FIG. 1(b) which shows a vortex tube 2 positioned between rotor discs 3, 4. There are examples of tube-type vortex reducers on the BR715 and BR725 engines at the HP4 location and the V2500 engine. Further examples can be found in US2004179936A, US2003101730A and US2009282834A. The vortex tubes constrain the air flowing through them to rotate at disc speed preventing the formation of a strong vortex and limiting the pressure drop.

However, the tube-type vortex reducer is a heavy device and thus imposes a significant weight penalty. It is also mechanically difficult to implement and problems have been experienced with high cycle fatigue in some applications. The area of the tubes also limits the amount of flow that can be drawn through the system. Typically the air will have to be accelerated to disc speed at entry to the tubes and losses associated with this process increase the system pressure loss.

There is an example of a tubeless vortex reducer on the BR710 engine, see for example FIG. 1(c) in which bleed air 1 is guided between compressor discs 3, 4 by a guide vane 6. A further example can be found in U.S. Pat. No. 6,361,277B1. Tubeless vortex reducers utilise a nozzle or a nozzle guide vane built into the rotating assembly of the compressor towards the outer radius of the cavity. These de-swirl the air as it passes through them; that is they impart a tangential component of velocity to the air in the opposite direction to the rotation of the disc. This means that the air has minimal angular momentum at the outer radius of the cavity so the vortex that it forms as it flows radially inwards is weak, i.e. with a low tangential velocity. As a result there is a smaller pressure drop across the vortex reducer.

The tubeless vortex reducer overcomes the problems associated with the tube-type vortex reducer, since they are relatively light and are mechanically simpler. Tubeless vortex reducers use the internal energy of the air to achieve the vortex reduction and so have lower losses than the tube-type vortex reducer and they have the potential to carry more throughflow as the frictional losses in the tube are eliminated.

However, the tubeless vortex reducer has a complex flow characteristic which has meant that it has a history of behaving unexpectedly when used on engines. With most tubeless vortex reducer designs there is a range of operating pressure ratios where the flow characteristic is multi-valued, i.e. there is not a unique level of mass-flow associated with an imposed pressure ratio. This can lead to the device behaving unstably or not producing the expected level of bleed flow. As a result of this the tubeless design is not widely used despite its potential advantages.

With reference to FIG. 2, the multi-valued flow characteristic of the tubeless vortex reducer can be understood by considering the individual elements of the pressure loss, namely the de-swirl nozzle and the subsequent vortex downstream of the de-swirl nozzle. In a low mass-flow region 10 of the characteristic the pressure loss through the nozzle will be small and the velocity exiting the nozzle will also be small. This means that very little de-swirl is achieved and the vortex inboard of the nozzle will be strong and have a high pressure drop. The same overall pressure drop can be realized at a higher mass-flow, e.g. in the high mass-flow region 12, where there is a relatively high pressure drop across the de-swirl nozzle and a significant reduction in the swirl velocity entering the vortex. This means that the vortex is weak and has a relatively small pressure drop. In between the low and high mass-flow regions 10, 12 there is an unstable region 14 which provides a negative resistance such that if the mass-flow increases the pressure drop reduces and yet more mass-flow is encouraged (or vice versa). As a result, in the shaded region 16 shown in FIG. 2, the characteristic is bistable and at this range of pressure ratios the system can give either low or high flow.

This multi-valued characteristic is very undesirable in most air-system applications as it leads to uncertainty over the level of flow in the system if it should operate over the range of pressure ratios where the bistable behaviour is present.

The present disclosure therefore seeks to address these issues.

According to a first aspect of the present disclosure there is provided a vortex reducer for a bleed flow in an axial turbomachine comprising a rotor disc, the vortex reducer comprising one or more guide channels arrangeable adjacent to a first side of the rotor disc to at least partially de-swirl the bleed flow, wherein the vortex reducer further comprises a passage connecting the first side of the rotor disc to a high pressure flow source capable of providing a secondary flow to the first side of the rotor disc to mix with the bleed flow on the first side of the rotor disc.

The secondary flow may flow from a second side of the rotor disc. The second side of the rotor disc may be at a higher pressure than the first side of the rotor disc due to the rotation of the rotor blades. The high pressure flow source may be on the second side of the rotor disc. For example, in the case of an axial compressor, the first side of the rotor disc may be upstream of the second side of the rotor disc, i.e. with respect to the mainstream flow through the compressor. The energy imparted by the compressor rotor may increase the pressure of the mainstream flow across the rotor and thus the pressure at the second side of the rotor disc may be higher than the pressure at the first side of the rotor disc.

By contrast, in the case of an axial turbine, the first side of the rotor disc may be downstream of the second side of the rotor disc, i.e. with respect to the mainstream flow through the turbine. The energy imparted to the turbine rotor may reduce the pressure of the mainstream flow across the rotor and thus the pressure at the second side of the rotor disc may be higher than the pressure at the first side of the rotor disc.

The passage may pass through an opening in the rotor disc. The passage may be provided through a securing means. As such the securing means may be hollow. The securing means may be adapted to secure the vortex reducer to the rotor disc. The securing means may comprise a nut and bolt assembly.

An outlet of the passage may be provided on the first side of the rotor disc. The outlet may be provided upstream of the guide channel, i.e. upstream with respect to the bleed flow. Alternatively, the outlet of the passage may be provided downstream of the guide channel or the outlet of the passage may be provided within the guide channel.

The guide channel may be defined by one or more guide portions adapted to guide and at least partially de-swirl the bleed flow. The guide portions may comprise guide vanes. The guide channel defined by the guide portions may comprise a radially angled passage. The guide portions may provide walls which may form the guide channel. The guide portions may be tubular.

The outlet of the passage may be provided between adjacent guide portions, e.g. in the guide channel between adjacent guide vanes. Alternatively, the outlet of the passage may be provided in a further channel provided within a guide portion. The further channel may extend part way along the length of the guide portion and may extend from a downstream end of the guide portion. For example, in the case of the guide portions comprising guide vanes, the further channel may be provided within the guide vane and the further channel may extend part way along the length of the vane from a trailing edge of the vane.

A compressor, turbine or gas turbine may comprise the aforementioned vortex reducer.

According to a second aspect of the present disclosure there is provided a method of reducing a vortex in a bleed flow within an axial turbomachine comprising a rotor disc, wherein the method comprises: at least partially de-swirling the bleed flow with one or more guide channels arrangeable adjacent to a first side of the rotor disc; passing a secondary flow from a high pressure flow source through a passage; and mixing the secondary flow from the high pressure flow source with the bleed flow on the first side of the rotor disc.

The method may further comprise passing the high pressure secondary flow from a second side of the rotor disc, through the passage and to the first side of the rotor disc.

The method may further comprise: providing the rotor disc with one or more rotor blades; and rotating the rotor disc such that the pressure is higher on the second side of the rotor disc.

The vortex reducer and method disclosed herein may eliminate or substantially reduce the multi-valued region of the tubeless vortex reducer flow characteristic such that the vortex reducer may behave stably and reliably in engine operation.

For a better understanding of the present disclosure, and to show more clearly how it may be carried into effect, reference will now be made, by way of example, to the accompanying drawings, in which:—

Figure 1C:
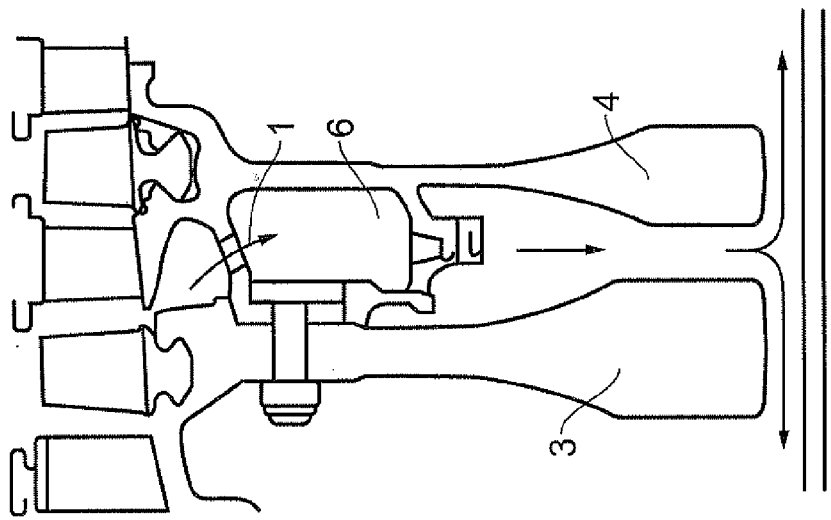
FIG. 1 shows three prior art arrangements with FIG. 1(a) showing a bleed off-take with an unconstrained vortex, FIG. 1(b) showing a tube-type vortex reducer and FIG. 1(c) showing a tubeless vortex reducer.
Figure 1B:
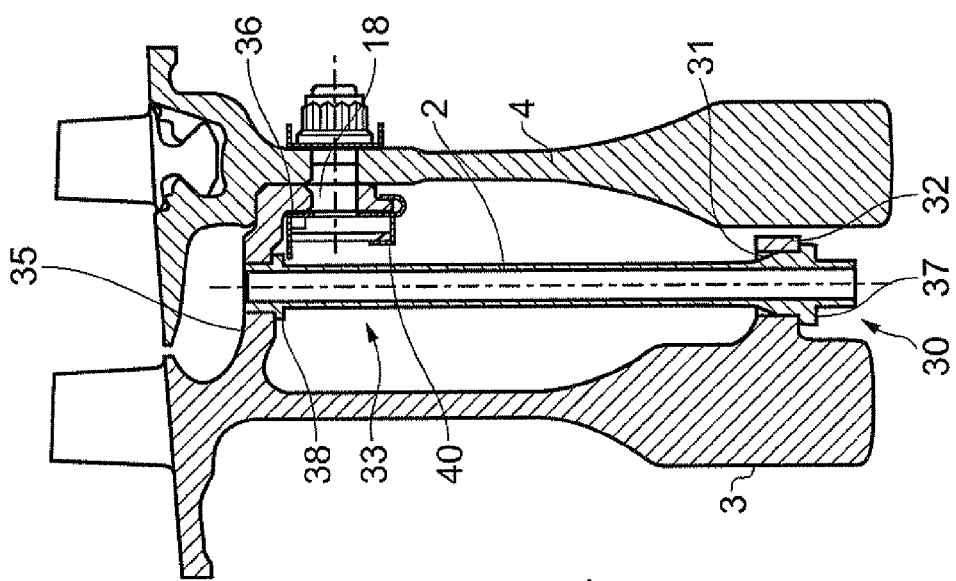
Figure 1A:
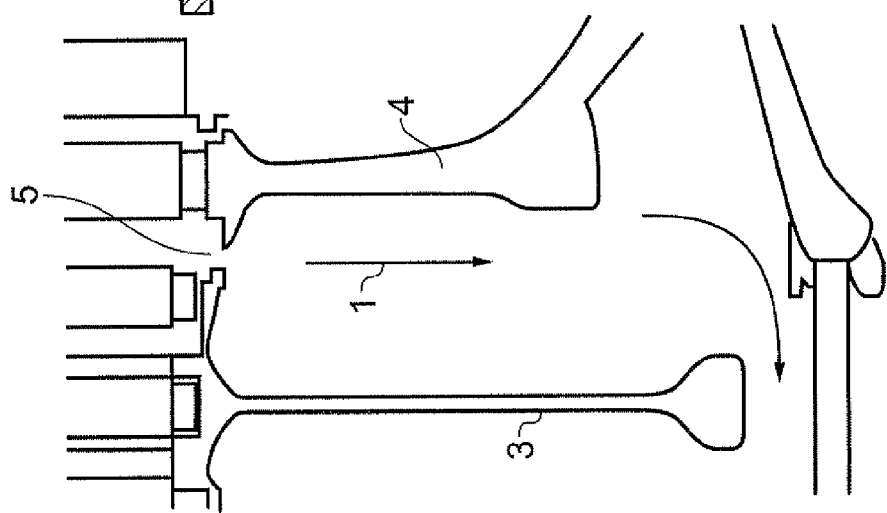
Figure 2:
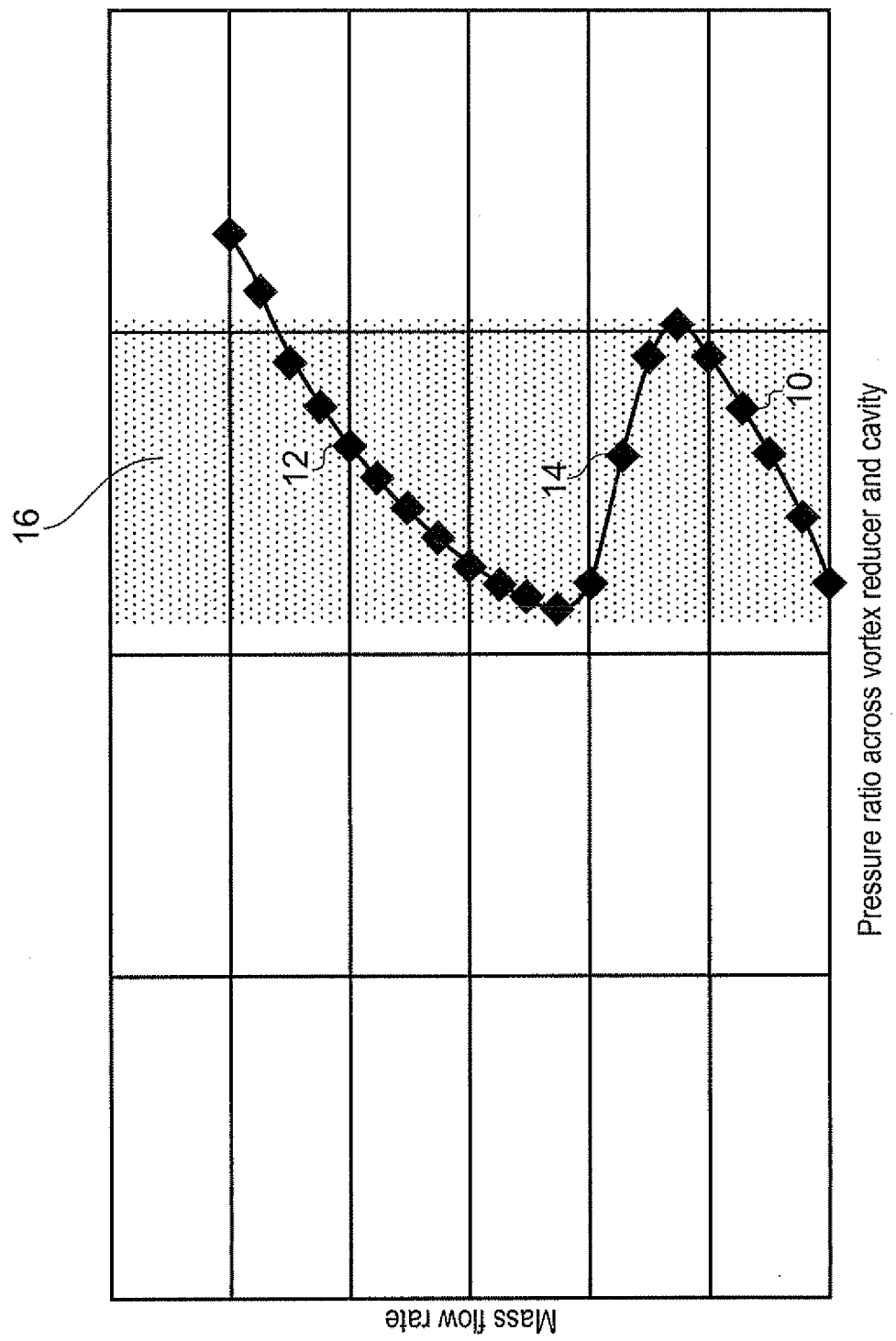
FIG. 2 shows the mass-flow to pressure drop characteristic for a typical tubeless vortex reducer.
Figures 3A, 3B:
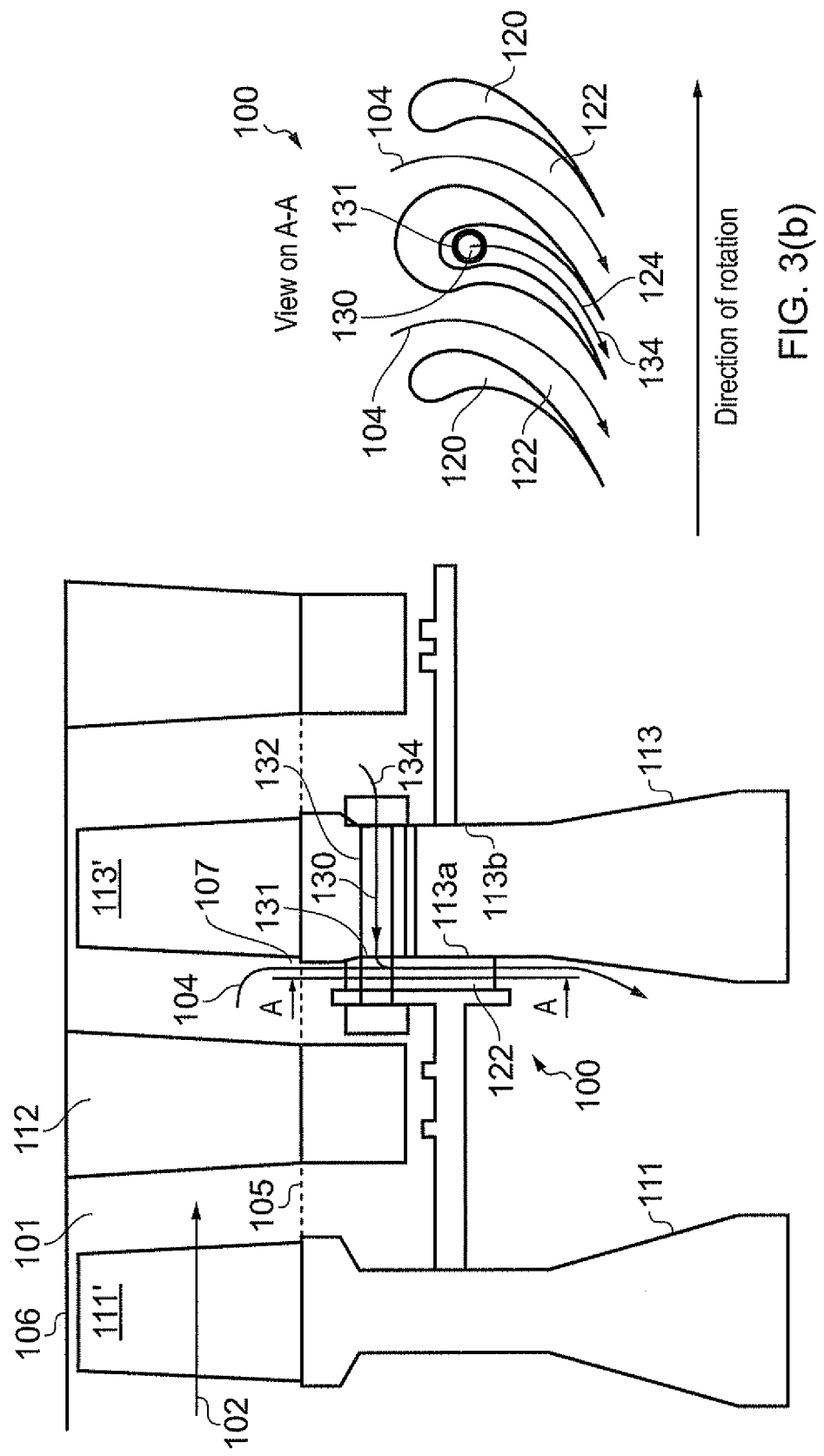
Figure 4:
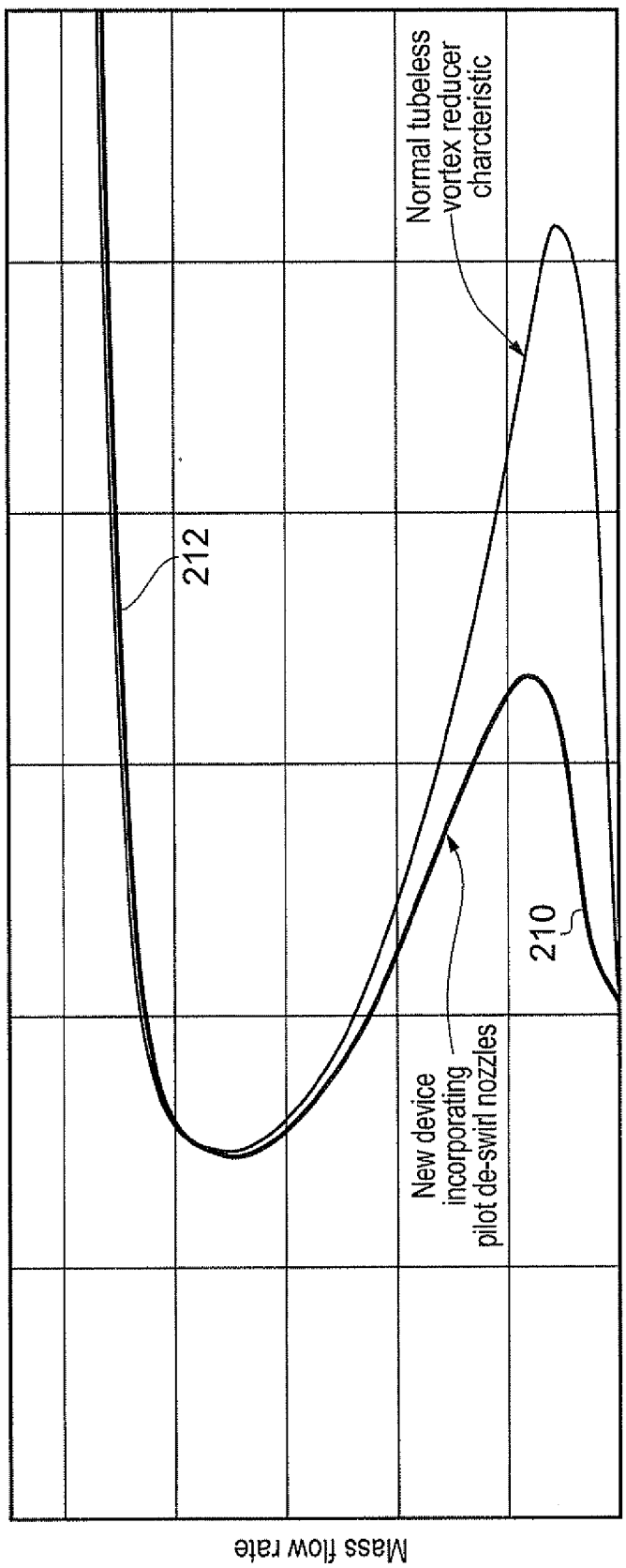

FIG. 3 shows a vortex reducer according to an example of the present disclosure with FIG. 3(a) showing a side sectional view of the turbomachine and FIG. 3(b) showing a sectional view corresponding to section AA shown in FIG. 3(a); and FIG. 4 shows the mass-flow to pressure drop characteristic for the vortex reducer of the present disclosure compared with the corresponding characteristic for a typical tubeless vortex reducer.

With reference to FIG. 3, a vortex reducer 100, according to an example of the present disclosure, is configured to reduce the vortex in a bleed flow bled from a mainstream flow 102 within an axial compressor. Although not shown, the vortex reducer of the present disclosure may also be applied to an axial turbine.

A mainstream flow 102 flows in a main annulus 101 between a hub wall 105 and casing wall 106 and flows from left to right as shown. A bleed flow 104 is bled off the mainstream flow 102. The bleed flow may be used for cooling, sealing or any other purpose. A bleed off-take may comprise an opening 107 in the hub wall and the opening may be inboard (e.g. adjacent to the hub) and/or mid-stage (e.g. between stages in a multistage axial turbomachine). For example, the bleed off-take may be provided downstream of a first stator 112 and may direct flow towards the bore of the compressor drum between first and second rotor discs 111, 113. The rotor discs may comprise one or more rotor blades 111', 113'.

The vortex reducer 100 may comprise one or more guide channels 122 arrangeable adjacent to a first side 113a of the rotor disc 113 to at least partially de-swirl the bleed flow 104. The guide channels 122 may be defined by one or more guide portions adapted to guide and at least partially de-swirl the bleed flow 104. The guide portions may comprise guide vanes 120. For example, the bleed off-take may further comprise a tubeless vortex reducer, which in the embodiment shown in FIG. 3(b) may comprise a set of nozzle guide vanes 120. The nozzle guide vanes 120 may impart a tangential velocity to the bleed flow, e.g. in the opposite direction to the rotation of the rotor disc 113. Alternatively, the bleed off-take may comprise a tube-type vortex reducer, e.g. tubes, which may be angled with respect to a radial component of the rotor disc 113.

The vortex reducer 100 may further comprise a passage 130 connecting the first side 113a of the rotor disc to a high pressure flow source. The high pressure flow source may be capable of providing a secondary bleed flow 134 to the first side 113a of the rotor disc to mix with the bleed flow 104 on the first side of the rotor disc.

In the example shown in FIG. 3, the high pressure flow source may comprise fluid adjacent to a second side 113b of the rotor disc, e.g. from the cavity behind the second stage of rotor blades. The second side 113b of the rotor disc may be at a higher pressure than the first side of the rotor disc due to the rotation of the rotor blades. Mainstream flow 102 may be in fluid communication with fluid adjacent to the second side 113b of the rotor disc.

The passage 130 may pass through an opening in the rotor disc 113 to provide high pressure fluid 134 to the bleed flow 104. The passage 130 may be provided through a securing means 132, which may be hollow. The securing means 132 may comprise a nut and bolt assembly, which may be adapted to secure the vortex reducer 100 to the rotor disc 113.

An outlet 131 of the passage 130 may be provided on a first side 113a of the rotor disc The outlet 131 may be located in a further channel 124 provided within the guide vanes 120. The further channel 124 may extend part way along the length of a guide vane 120. The further channel 124 may extend from a trailing edge of the guide vane and towards a leading edge. As a result, the further bleed flow 134 from the second side 113b of the rotor disc may flow through the passage 130, out of the outlet 131 and through the further channel 124. The further bleed flow 134 may then mix with the bleed flow 104 at the trailing edge of the guide vanes 120. The further channel 124 may be a pilot de-swirl nozzle adapted to encourage a de-swirling flow in particular at low bleed mass-flow rates.

Each guide vane 120 may comprise the further channel 124 or as shown not every guide vane 120 may comprise the further channel 124. The number of further channels 124 may be small relative to the number of guide channels 122. The flow area for the secondary bleed flow 134 may be relatively small with respect to the flow area for the bleed flow 104.

FIG. 4 shows the modified characteristic of the vortex reducer 100 according to the present disclosure. In the high mass-flow region 212 the additional bleed flow 134 may be relatively small so that it contributes a minimal amount to the total bleed flow and does not substantially influence the flow characteristic. However in the low mass-flow region 210 of the characteristic there is very little pressure drop across the main guide nozzles 120, whereas the pilot nozzle guide vanes, e.g. formed by further channels 124, may have a higher pressure drop due to their higher feed pressure. The pilot nozzles thus provide the majority of the flow at this point. The relatively high pressure drop across the pilot nozzles means that they also impart a significant de-swirl to the air. The pilot nozzles 124 therefore act to reduce the vortex at much lower mass-flow rates than the main nozzles 122 alone would do. This significantly reduces the bi-stable region of the tubeless vortex reducer characteristic and hence makes it more suitable for use in an air-system design.

The present disclosure eliminates or substantially reduces the bistable region of the characteristic by introducing a second bleed of higher pressure air into the vortex reducer nozzles from a higher pressure source. This flow area for the further bleed flow 134 may be substantially smaller than the flow area for the bleed flow 104. Nevertheless, the further bleed flow 134 may act as a pilot de-swirl flow that reduces the vortex pressure loss at low mass flow rates until the main de-swirl flow is established at higher flow rates. Accordingly, a key advantage of the present disclosure over the previously-proposed vortex reducer is that it will operate in a stable and predictable manner over a much greater range of operating conditions. This is achieved by providing a second smaller set of de-swirl vanes or nozzles that act as a pilot flow to de-swirl the vortex at low levels of through-flow.

The present disclosure may be based on a conventional tubeless vortex reducer, e.g. a device that may be employed when taking air bleeds radially inboard from compressors to reduce the pressure loss in the vortex flow between the compressor discs. Over a range of operating pressures such devices may be bi-stable and this can lead to the devices passing a bleed flow which is significantly lower than required. However, by incorporating a relatively small number of pilot de-swirl nozzles (e.g. with respect to the number of guide nozzles) fed from a higher pressure source of air, this bi-stable region can be substantially reduced or eliminated. This can be used to ensure the device passes a reliable level of flow.

There may be a number of alternative configurations to the embodiment shown. The higher pressure flow source could be ducted to the pilot de-swirl nozzles in a variety of ways. The guide nozzles themselves may be guide vanes as shown, cylindrical drilled holes or any other guide channel.

The invention claimed is:

1. A vortex reducer for a bleed flow in an axial turbomachine comprising a rotor disc, the vortex reducer comprising:
   one or more guide channels arrangeable adjacent to a first side of the rotor disc to at least partially de-swirl the bleed flow;
   a passage connectable to a high pressure flow source, the passage being adapted to provide a secondary flow from the high pressure flow source to mix with the bleed flow on the first side of the rotor disc, wherein
   the one or more guide channels are each defined by one or more guide portions adapted to guide and at least partially de-swirl the bleed flow, and
   an outlet of the passage is provided in a further channel provided within the guide portions.

2. The vortex reducer of claim 1, wherein the secondary flow comes from a second side of the rotor disc.

3. The vortex reducer of claim 2, wherein the rotor disc is provided with one or more rotor blades and the second side of the rotor disc is at a higher pressure than the first side of the rotor disc due to rotation of the rotor blades.

4. The vortex reducer of claim 2, wherein the passage passes through an opening in the rotor disc.

5. The vortex reducer of claim 2, wherein the passage is provided through a securing means, the securing means being adapted to secure the vortex reducer to the rotor disc.

6. The vortex reducer of claim 1, wherein the outlet of the passage is provided between adjacent guide portions.

7. A compressor, turbine or gas turbine comprising the vortex reducer of claim 1.

8. A vortex reducer for a bleed flow in an axial turbomachine comprising a rotor disc, the vortex reducer comprising:
   one or more guide channels arrangeable adjacent to a first side of the rotor disc to at least partially de-swirl the bleed flow; and
   a passage connectable to a high pressure flow source, the passage being adapted to provide a secondary flow from the high pressure flow source to mix with the bleed flow on the first side of the rotor disc,
   an outlet of the passage being provided between adjacent guide portions, and being provided in a further channel provided within the guide portions.

9. A method of reducing a vortex in a bleed flow within an axial turbomachine comprising a rotor disc, wherein the method comprises:
   at least partially de-swirling the bleed flow with one or more guide channels arrangeable adjacent to a first side of the rotor disc;
   passing a secondary flow from a high pressure flow source through a passage; and
   mixing the secondary flow from the high pressure flow source with the bleed flow on the first side of the rotor disc, wherein
   the one or more guided channels are each defined one or more guide portions adapted to guide and at least partially de-swirl the bleed flow, and
   an outlet of the passage is provided in a further channel provided within the guide portions.

10. The method of claim 9, wherein the method further comprises:
 passing the secondary flow from a second side of the rotor disc, through the passage and to the first side of the rotor disc.

11. The method of claim 9, wherein the method further comprises:
 providing the rotor disc with one or more rotor blades; and
 rotating the rotor disc such that the pressure is higher on the second side of the rotor disc.

* * * * *